Aug. 4, 1964  S. M. TERRY  3,143,692

CAPACITOR WITH HOUSING END SEAL

Filed March 13, 1961

INVENTOR.
STANLEY M. TERRY

BY *Teller, McCormick, Paulding & Huber*

ATTORNEYS

3,143,692
CAPACITOR WITH HOUSING END SEAL
Stanley M. Terry, Longmeadow, Mass., assignor, by mesne assignments, to Three Rivers Industries, Inc., Three Rivers, Mass., a corporation of Massachusetts
Filed Mar. 13, 1961, Ser. No. 95,210
7 Claims. (Cl. 317—260)

This invention relates to an electrical condenser, and deals more particularly with a condenser of the type having a tubular metal case which comprises one terminal of the condenser and an insulated wire lead at one end of the case which lead comprises the other terminal of the condenser.

Condensers of the foregoing type, although they may have other uses, are used in large numbers in the ignition systems of various different internal combustion engines. In such systems they are customarily placed in parallel with the breaker points or contacts of the interrupter mechanism to prevent undue arcing and burning of the contacts as the latter are opened. The contacts used in the interrupter mechanism generally, in the case of multi-cylinder engines, are incorporated into the distributor mechanism with the condenser case being fixed and electrically grounded to a part of the distributor structure. The wire lead of the condenser is in turn connected to a suitable terminal which is also connected with one of the breaker points and with one end of the primary winding of the ignition coil or magneto. Since the condensers are used in large numbers it is highly desirable that their cost be reduced to as low a point as possible.

The general object of the invention is therefore to provide an improved construction for a condenser of the general type set forth above whereby the cost of producing the same is reduced.

Another object of the invention is to provide a condenser assembly of the foregoing general type having improved waterproof or moisture-resistant characteristics and which assembly avoids the use of rubber sealing washers thereby giving the assembly high and low temperature stability and overcoming the possibility of obtaining improper seals due to slight variations in the length of the condenser case or can.

A further object of the invention is to provide a condenser assembly of the foregoing general type in which the possibility of damage due to moisture seeping into the case by leaking down the wire lead from its outer end is entirely eliminated and in which the moisture seal does not depend on a tight bond between a sealing compound and the insulation of the lead wire, as said insulation is often coated with a thin layer of silicone oil or other extruding lubricant used in the manufacture of the wire which makes it difficult, if not impossible, to obtain a moistureproof bond with the insulation.

A still further object of the invention is to provide, in a condenser of the foregoing type, an epoxy resin seal which imparts additional strength and rigidity to the condenser assembly and which in cooperation with other parts of the assembly provides a positive moistureproof seal for the condenser element.

Another object of the invention is to provide a condenser assembly of the foregoing character wherein the wire lead is supported on its insulating jacket adjacent its connection with the other parts of the assembly thereby avoiding sharp bending and possible fatigue failure of the wire at said connection.

Other objects and advantages of the invention will be apparent from the following description and from the accompanying drawing which forms a part of the same.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Figure 1:
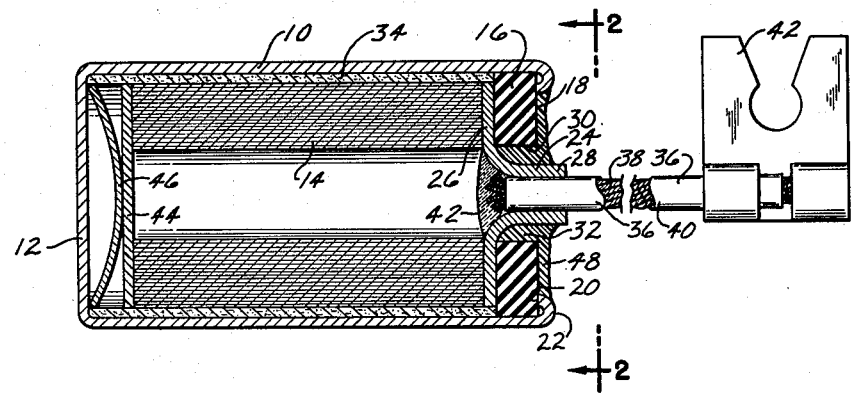
FIG. 1 is a longitudinal sectional view taken through a condenser assembly embodying the present invention with the wire lead being shown in elevation rather than in section.

Referring to the drawing, the illustrated condenser assembly is shown to include a tubular metal case or can 10 which is generally cylindrical in shape and which is closed at one end and open at the other end. As viewed in FIG. 1, the left-hand end of the case 10 is closed by an integral base portion 12 and the right-hand end is open.

Housed within the case 10 is a generally cylindrical condenser element 14 which is of a conventional construction and which consists of two lengths or strips of metallic foil separated by several lengths or strips of paper or other insulating material and all of which are wound into a cylindrical roll. One of the rolled or coiled longitudinal edges of one of the strips of foil extends slightly beyond the associated edges of the paper strips at one end of the element while the other strip of foil has one of its rolled or coiled longitudinal edges extending slightly beyond the associated edges of the paper strips at the other end of the element. Thus electrical contact may be made with either of the strips of metallic foil by a metallic contact element pressed against the appropriate end of the condenser element. It is to be understood, however, that the invention in its broader aspects is not limited to this particular construction of the condenser element and that other suitable constructions may be employed without departing from the invention. In any event, the condenser element 14 is of a shorter length than the case 10 and is arranged within the case so that at its open or right-hand end the case extends some distance beyond the corresponding end of the condenser element.

According to the invention the illustrated condenser assembly further includes a centrally apertured insulating washer 16, made of a molded phenolic resin or other suitable insulating material, positioned within the open end of the case 10. The case and the washer are so dimensioned that the case extends axially a slight distance beyond the outer surface 18 of the washer and preferably the case is bent inwardly and reversely, as shown, to bring the end edge 20 thereof into engagement with the outer washer surface 18. As shown, the bent end portion of the case thus defines an annular bead 22 which extends axially outwardly from the outer margin of the washer.

Also located adjacent the open end of the case 10 is a metallic connector element 24. This element is generally in the form of a pierced washer and includes an annular radially extending portion 26 which on one side engages the inner surface of the insulating washer 16 and on its other side engages the corresponding end of the condenser element 14. Integrally connected with the annular portion 26 is a tubular portion or chimney 28 which extends axially outwardly from the annular portion, or to the right as viewed in FIG. 1, and through at least an axial portion of the opening 30 in the insulating washer 16. Preferably, and as shown, the tubular portion extends entirely through the washer 16 and slightly beyond the outer surface thereof. Also, the opening 30 is preferably of a somewhat larger diameter than the outside diameter of the tubular portion so as to define an annular recess 32 between the washer and the tubular portion for receiving a quantity of sealing material as hereinafter described.

Between the condenser element 14 and the case 10 is a tubular insulating member 34 made from paper or other suitable insulating material. Preferably the insulating member 34 is longer than the condenser element 14 so as to engage the closed end or base portion 12 of the case at one end while at its other end it extends slightly beyond the corresponding end of the condenser element 14 and engages the inner surface of the insulating washer 16. That is, the washer 16 seats against the corresponding end of the insulating member 34 and is held in place with respect to the case 10 by being fixed between the end edge of the insulating member and the end edge 20 of the case. In addition, the annular portion 26 of the connector element 24 is designed to have a diameter substantially equal to the inside diameter of the tubular insulating member 34 and is fitted into the end portion of the latter as shown in FIG. 1. The member 34 therefore serves to accurately center and to radially support the connector element.

The connector element 24 serves both as a means for making electrical contact with one end of the condenser element 14 and as a means for supporting and making electrical connection with a wire lead 36. As is the case with most similar constructions, the lead 36 consists of a stranded wire conductor 38 surrounded by an insulating jacket 40 made of a suitable electrical insulating material. At its outer end the lead is provided with a terminal 42 which may be of various different designs depending on the nature of the other parts of the assembly in which the condenser is used. At its inner, or left-hand end as viewed in FIG. 1, the lead 36 is received by the tubular portion 28 of the connector element 24, and the conductor 38 is soldered, as indicated at 42, to the connector element adjacent the inner end of its tubular portion 28. The soldered joint, as will be noted from FIG. 1, is such that the conductor and solder completely close or seal the bore of the tubular portion 28. Thus any moisture which might seep through the length of the lead from its outer end due to the stranded construction of the conductor or to a loose fit between the insulating jacket and the conductor is positively prevented from entering the interior of the case 10.

The insulating jacket of the lead 36 preferably extends some distance into the bore of the tubular portion 28 and has such an outside diameter as to closely fit with the bore of the tubular portion, as shown. The tubular portion therefore acts to support the inner end of the lead and to prevent sharp bending and possible fatigue failure of the conductor immediately adjacent the soldered connection.

It will be noted that the terminal 42, through the lead wire and the connector element, is electrically connected with one end of the condenser element 14 and therefore constitutes one of the electric terminals of the condenser assembly. The other terminal is provided by the case 10. To make positive electrical connection between the case and the condenser element the assembly further includes another metallic washer 44 which is positioned adjacent the inner end of the condenser element. The latter washer is in turn held tightly in place against the condenser element by a metallic spring element 46 interposed between the washer and the closed end or base portion 12 of the case, as shown. The spring element therefore acts not only to hold the washer 44 against the condenser element, but also to bias the condenser element axially toward the connector element 24 so that the condenser element is also held tightly against the annular portion 26 of the connector element. As a result the connector element is held axially in place with respect to the case 10 by being clamped between the insulating washer 16 and the condenser element 14. Since the spring element 46 is metallic it also provides for an electrical connection between the inner washer 44 and the case 10.

In order to preserve the desired electrical characteristics of the condenser assembly it is very important that no moisture be permitted to enter the case 10. The condenser element 14 must be kept perfectly dry, and one of the features of this invention is the provision of a positive moistureproof seal. This seal is provided by the use of a sealing material in cooperation with the above-described structure at the open end of the case. As shown best in FIG. 1, a quantity of sealing material 48 is applied to the outer surface of the insulating washer 16 so as to cover the entire exposed area of the same between the case 10 and the outer surface of the tubular portion 28 and to fill the recess 32. In the manufacture of the condenser assembly the sealing material may be applied by turning the otherwise completed assembly upright, with the tubular portion and wire lead pointing upwardly, and pouring a small quantity of the sealing material in liquid form into the area between the bead 22 and the tubular portion. Thereafter the assembly is held upright until the sealing material hardens. The sealing material 48 is adhered to the case along the full circumference of the bead 22, is adhered to the outer surface of the washer 16 and is also adhered to the outer surface of the tubular portion 28 along its full periphery. A waterproof seal is therefore effected between the washer and the case and also between the washer and the tubular portion 28. Since the sealing material fills the recess 32 it also adheres to the axially extending inner circumferential surface of the washer 16, which surface defines the opening 30, and to the outer surface of that part of the tubular portion 28 located in the opening 30. Therefore, the axial length of the seal provided is much greater than would be the case if the recess 32 were not provided, and since moisture in entering the case through the joint between the tubular portion and the washer would have to pass in this axial direction the moistureproof nature of the seal is greatly improved. Since the bore of the tubular portion is completely sealed by the soldered joint these are the only two other joints through which moisture could pass in the absence of the sealing material, and therefore the presence of the sealing material absolutely prevents the passage of moisture into the case.

Preferably the sealing material 48 is an epoxy resin, as this material adheres or bonds itself very firmly to the case, the insulating washer 16 and the tubular portion 28 of the connector element 24. Also, after this material hardens it gains high strength and acts as a cement to additionally support the connector element and insulating washer with respect to the case and to prevent any looseness between the various parts. The end result is therefore a very solid and rigid construction.

It should be particularly noted that the illustrated condenser assembly does not rely on a bond between the sealing material and the insulating jacket of the wire lead to effect a seal for the case. Such bonds are often difficult to obtain, as because of naturally poor bonding between the sealing material and the jacket material or because of a thin layer of silicone oil or other extruding compound adhered to the surface of the jacket, and in the past have been the cause of many condenser failures. In the present case the bonds relied upon are between the sealing material and other materials to which the sealing material readily adheres. Likewise, the illustrated condenser assembly does not rely on the use of a rubber washer or washers to effect a seal for the case. Rubber generally creeps under heat so that prior constructions having rubber washers often failed when subjected to high temperatures. Similarly they also often failed at low temperatures. The use of a rubber sealing member also generally requires that the end edge of the case press tightly against the rubber, and any variations in the case length during manufacture may completely prevent the obtaining of a proper seal.

Figure 2:
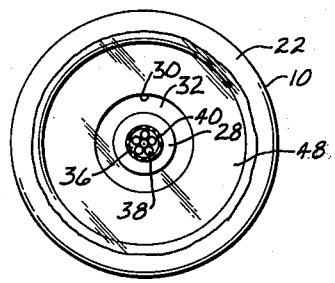
FIG. 2 is an elevational view of the right-hand end of the condenser assembly taken along the line 2—2 of FIG. 1.
Figure 3:
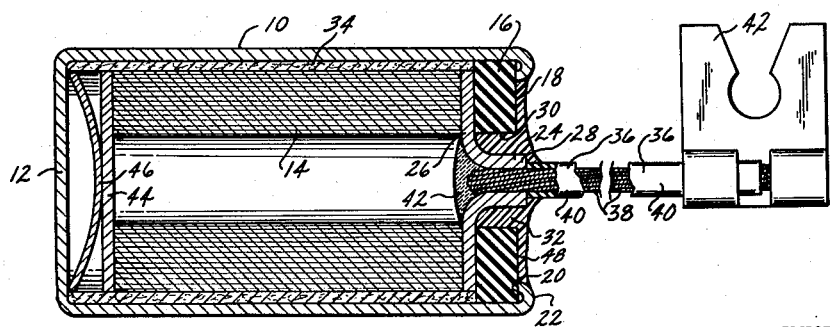
FIG. 3 is a view similar to FIG. 1 but showing an alternative embodiment of the invention.

FIG. 3 shows a slightly modified form of the condenser assembly of FIGS. 1 and 2. As mentioned in connection with FIGS. 1 and 2 it is preferred to have the insulating jacket of the wire lead extend into the bore of the tubular portion 28 of the connector element 24 so that the insulating jacket is supported by the tubular portion. It has been found, however, that depending on the jacket material and the method of soldering, a truly watertight soldered connection between the conductor 38 and the connector element 24 may be difficult to obtain because of gases given off by the jacket material during the soldering operation. In such instances the construction of FIG. 3, which avoids this soldering problem, may be used.

The condenser assembly of FIG. 3 is substantially the same as that of FIGS. 1 and 2, and therefore the same reference numerals are used in FIG. 3 as in FIGS. 1 and 2 to identify similar parts, it being deemed unnecessary to redescribe these parts. The difference between the two assemblies is that in the FIG. 3 assembly the diameter of the tubular portion 28 is made slightly smaller so as to receive only the conductor 38 of the wire lead 36. The insulating jacket 40 extends to the top of the bore in the tubular portion and seats against the end edge thereof as shown. Thus when the conductor is soldered to the connector element, as at 42, heating of the insulating jacket material will be substantially reduced and any gas given off by the jacket material will be unlikely to reach and effect the soldered joint.

The tubular portion 28 in the FIG. 3 assembly fits fairly closely with the conductor 38 passing therethrough and mechanically supports the same so as to prevent sharp bending and possible fatigue failure of the conductor immediately adjacent the soldered connection. Also, it is preferred, as shown in FIG. 3, that the length of the tubular portion 28 be such that when the sealing material 48 is applied it will extend beyond the end edge of the tubular portion and surround a portion of the insulating jacket of the lead 36. Thus, when the sealing material hardens it provides a mechanical support for the insulating jacket. As mentioned, the sealing material may not form a watertight bond with the jacket material, but such a bond is not required by this construction due to the watertight bonds and seals provided at other locations as explained in connection with FIGS. 1 and 2.

The invention claimed is:

1. In an electrical condenser assembly the combination comprising a tubular case having an open end, an apertured insulating washer positioned in said open end of said case and arranged so that said case projects axially some distance beyond the outer surface of said washer, a metallic connector element having an annular radially extending portion disposed adjacent the inner surface of said insulating washer and also having an axially extending tubular portion which projects outwardly from said annular portion and through at least an axial portion of the opening in said insulating washer, a wire lead having one end positioned in said tubular portion of said connector element and soldered to said connector element in such a manner that the solder and wire completely close the bore of said tubular portion, and a quantity of sealing material disposed adjacent the outer surface of said insulating washer which sealing material covers the entire exposed outer surface of said washer and is adhered to said tubular portion of said connector element, to said outer surface of said insulating washer and to said portion of said case which projects beyond said outer washer surface to provide a moistureproof seal between said washer and said case and between said washer and said tubular portion of said connector element, said opening in said insulating washer being of a substantially larger diameter than the outer surface of said tubular portion of said connector element so as to define an annular recess between said washer and said tubular portion, and said recess being filled with said sealing material so that said sealing material is adhered to the axially extending inner circumferential surface of said washer which surface defines said washer opening and to that part of the outer surface of said tubular portion located in said recess.

2. In an electrical condenser assembly the combination comprising a tubular case having an open end, an apertured insulating washer positioned in said open end of said case and arranged so that said case projects axially some distance beyond the outer surface of said washer, a metallic connector element having an annular radially extending portion disposed adjacent the inner surface of said insulating washer and also having an axially extending tubular portion which projects outwardly from said annular portion and through at least an axial portion of the opening in said insulating washer, a wire lead having one end positioned in said tubular portion of said connector element and soldered to said connector element in such a manner that the solder and wire completely close the bore of said tubular portion, and a quantity of sealing material disposed adjacent the outer surface of said insulating washer which sealing material covers the entire exposed outer surface of said washer and is adhered to said tubular portion of said connector element, to said outer surface of said insulating washer and to said portion of said case which projects beyond said outer washer surface to provide a moistureproof seal between said washer and said case and between said washer and said tubular portion of said connector element, said wire lead including a conductor surrounded by a jacket of insulating material, said conductor at said one end being received by said tubular portion of said connector element and said insulating jacket being extended inwardly to the top of said tubular portion so as to seat against the end edge thereof, said bore of said tubular portion having a diameter substantially equal to that of said conductor so that said tubular portion supports said conductor, and said sealing material being extended beyond the end edge of said tubular portion so as to surround and support a portion of said insulating jacket.

3. An electrical condenser assembly comprising a cylindrical condenser element, a tubular metal case surrounding said condenser element which case is closed at one end and open at the other end and which case is also substantially longer than said condenser element so as to extend at its open end some distance beyond the corresponding end of said condenser element, a tubular insulating member between said condenser element and said case which insulating member at one end engages the closed end of said case and which at its other end extends beyond said condenser element but by a smaller amount than said case with the result that said latter end is spaced inwardly from the very end of said case, an apertured insulating washer positioned in said open end of said case with its inner surface seated against the corresponding end of said tubular insulating member, said case extending a slight distance beyond the outer surface of said washer and being bent radially inwardly and reversely to bring the end edge thereof into engagement with the outer surface of said washer thereby defining an annular bead extending axially outwardly from the outer margin of said washer and with the result that said washer is axially held in place between said end of said tubular insulating member and said edge of said case, a metallic connector element having an annular radially extending portion disposed adjacent the inner surface of said insulating washer and also having a tubular portion which projects axially outwardly from said annular portion and extends through at least an axial portion of the opening in said insulating washer, a wire lead having one end positioned in said tubular portion of said connector element and soldered to said connector element in such a manner that the solder and wire completely close the bore of said tubular portion, and a quantity of sealing material disposed adjacent the outer surface of said insulating washer which sealing material covers the entire exposed outer surface of said insulating washer and is adhered to said tubular portion of said connector element, to said outer surface of said insulating washer and to said bead at the open end of said case to provide a waterproof seal between said washer and said bead and between said washer and said tubular portion of said connector element, said annular portion of said connector element having a diameter substantially equal to the inside diameter of said tubular insulating member and being fitted within the corresponding end of said tubular insulating member so as to be supported thereby in concentric relation to said case.

4. An electrical condenser assembly comprising a cylindrical condenser element, a tubular metal case surrounding said condenser element which case is closed at one end and open at the other end and which case is also substantially longer than said condenser element so as to extend at its open end some distance beyond the corresponding end of said condenser element, a tubular insulating member between said condenser element and said case which insulating member at one end engages the closed end of said case and which at its other end extends beyond said condenser element but by a smaller amount than said case with the result that said latter end is spaced inwardly from the very end of said case, an apertured insulating washer positioned in said open end of said case with its inner surface seated against the corresponding end of said tubular insulating member, said case extending a slight distance beyond the outer surface of said washer and being bent radially inwardly and reversely to bring the end edge thereof into engagement with the outer surface of said washer thereby defining an annular bead extending axially outwardly from the outer margin of said washer and with the result that said washer is axially held in place between said end of said tubular insulating member and said edge of said case, a metallic connector element having an annular radially extending portion disposed adjacent the inner surface of said insulating washer and also having a tubular portion which projects axially outwardly from said annular portion and extends through at least an axial portion of the opening in said insulating washer, a wire lead having one end positioned in said tubular portion of said connector element and soldered to said connector element in such a manner that the solder and wire completely close the bore of said tubular portion, and a quantity of sealing material disposed adjacent the outer surface of said insulating washer which sealing material covers the entire exposed outer surface of said insulating washer and is adhered to said tubular portion of said connector element, to said outer surface of said insulating washer and to said bead at the open end of said case to provide a waterproof seal between said washer and said bead and between said washer and said tubular portion of said connector element, said opening in said insulating washer being of a substantially larger diameter than the outer surface of said tubular portion of said connector element so as to define an annular recess between said washer and said tubular portion, and said recess being filled with said sealing material.

5. The combination as defined in claim 4 further characterized by said sealing material consisting of an epoxy resin.

6. An electrical condenser assembly comprising a cylindrical condenser element, a tubular metal case surrounding said condenser element which case is closed at one end and open at the other end and which case is also substantially longer than said condenser element so as to extend at its open end some distance beyond the corresponding end of said condenser element, a tubular insulating member between said condenser element and said case which insulating member at one end engages the closed end of said case and which at its other end extends beyond said condenser element but by a smaller amount than said case with the result that said latter end is spaced inwardly from the very end of said case, an apertured insulating washer positioned in said open end of said case with its inner surface seated against the corresponding end of said tubular insulating member, said case extending a slight distance beyond the outer surface of said washer and being bent radially inwardly and reversely to bring the end edge thereof into engagement with the outer surface of said washer thereby defining an annular bead extending axially outwardly from the outer margin of said washer and with the result that said washer is axially held in place between said end of said tubular insulating member and said edge of said case, a metallic connector element having an annular radially extending portion disposed adjacent the inner surface of said insulating washer and also having a tubular portion which projects axially outwardly from said annular portion and extends through at least an axial portion of the opening in said insulating washer, a wire lead having one end positioned in said tubular portion of said connector element and soldered to said connector element in such a manner that the solder and wire completely close the bore of said tubular portion, and a quantity of sealing material disposed adjacent the outer surface of said insulating washer which sealing material covers the entire exposed outer surface of said insulating washer and is adhered to said tubular portion of said connector element, to said outer surface of said insulating washer and to said bead at the open end of said case to provide a waterproof seal between said washer and said bead and between said washer and said tubular portion of said connector element, said wire lead including a conductor surrounded by a jacket of insulating material, said conductor at said one end being received by said tubular portion of said connector element and said insulating jacket being extended inwardly to the top of said tubular portion so as to seat against the end edge thereof, said bore of said tubular portion having a diameter substantially equal to that of said conductor so that said tubular portion supports said conductor, and said sealing material being extended beyond the end edge of said tubular portion so as to surround and support a portion of said insulating jacket.

7. In an electrical condenser assembly the combination comprising a tubular case having an open end, an apertured insulating washer positioned in said open end of said case and arranged so that said case projects axially some distance beyond the outer surface of said washer, a metallic connector element having an annular radially extending portion disposed adjacent the inner surface of said insulating washer and also having an axially extending tubular portion which projects outwardly from said annular portion and through at least an axial portion of the opening in said insulating washer, a wire lead including a conductor surrounded by a jacket of insulating material, said conductor at one end of said lead extending beyond the associated end of said insulating jacket and being positioned in said tubular portion of said connector element and soldered to said connector element in such a manner that the solder and conductor completely close the bore of said tubular portion, said bore of said tubular portion having a diameter substantially equal to that of said conductor so that said tubular portion supports said conductor, and a quantity of sealing material disposed adjacent the outer surface of said insulating washer which sealing material covers the entire exposed outer surface of said washer and is adhered to said tubular portion of said connector element, to said outer surface of said insulating washer and to said portion of said case which projects beyond said outer washer surface to provide a moistureproof seal between said washer and said case and between said washer and said tubular portion of said connector element, said sealing material being extended beyond the end edge of said tubular portion so as to surround and support a portion of said insulating jacket.

References Cited in the file of this patent

UNITED STATES PATENTS

| | | |
|---|---|---|
| 2,323,124 | Edmundson | June 29, 1943 |
| 2,539,332 | Schneider | Jan. 23, 1951 |
| 2,891,362 | Bettridge | June 23, 1959 |
| 2,970,182 | Miquelis | Jan. 31, 1961 |